United States Patent
Shen et al.

(10) Patent No.: US 10,193,937 B2
(45) Date of Patent: Jan. 29, 2019

(54) INTERNET PROTOCOL MULTIMEDIA SUBSYSTEM (IMS) RESTORATION SUPPORT FOR TEMPORARY GLOBALLY ROUTABLE USER AGENT UNIFORM RESOURCE IDENTIFIER (GRUU)

(71) Applicant: NOKIA SOLUTIONS AND NETWORKS OY, Espoo (FI)

(72) Inventors: Jiadong Shen, Munich (DE); Ulrich Wiehe, Bad Hersfeld (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/315,175

(22) PCT Filed: Jun. 2, 2014

(86) PCT No.: PCT/EP2014/061349
§ 371 (c)(1),
(2) Date: Nov. 30, 2016

(87) PCT Pub. No.: WO2015/185088
PCT Pub. Date: Dec. 10, 2015

(65) Prior Publication Data
US 2017/0237782 A1    Aug. 17, 2017

(51) Int. Cl.
*H04L 29/06* (2006.01)
*H04L 29/08* (2006.01)

(52) U.S. Cl.
CPC ...... *H04L 65/1073* (2013.01); *H04L 65/1016* (2013.01); *H04L 65/1033* (2013.01); *H04L 67/306* (2013.01)

(58) Field of Classification Search
CPC ............. H04L 65/1073; H04L 65/1016; H04L 67/306; H04L 29/06; H04L 29/08;
(Continued)

(56) References Cited

U.S. PATENT DOCUMENTS

2003/0097584 A1* 5/2003 Haukka ................... H04L 29/06 726/7
2003/0114151 A1* 6/2003 Lahtinen ............ H04B 7/18567 455/419

(Continued)

FOREIGN PATENT DOCUMENTS

EP          1 988 662 A1    11/2008
KR          2012-0071129 A   7/2012

OTHER PUBLICATIONS

International Search Report and Written Opinion dated Mar. 9, 2015 corresponding to International Patent Application No. PCT/EP2014/061349.

(Continued)

*Primary Examiner* — Meless Zewdu
(74) *Attorney, Agent, or Firm* — Squire Patton Boggs (US) LLP

(57) ABSTRACT

The present invention provides apparatuses, methods, computer programs, computer program products and computer-readable media regarding IMS (Internet Protocol Multimedia Subsystem) restoration support for temporary GRUU (Globally Routable User Agent Uniform Resource Identifier). Certain aspects of the present invention include creating, at a registrar, a registration identified by a registration identifier, and storing, by the registrar, the registration identifier, a call identifier and an initial command sequence related to the registration identified by the registration identifier in a persistent database during the registration.

12 Claims, 5 Drawing Sheets

(58) Field of Classification Search
CPC . H04L 61/308; H04L 61/3085; H04L 61/309;
H04L 61/3095; H04L 65/1033; H04L
61/00; G06F 17/30587; G06F 7/30589;
G06F 17/30595; G06F 11/0787; G06F
11/1471; G06F 11/1662; H04M 15/57;
H04M 15/56; H04M 15/41; H04M
3/42076; H04M 3/4211; H04M 3/42119;
H04W 8/18; H04W 8/04; H04W 60/00;
H04W 76/021; H04W 8/02; H04W 8/06;
H04W 60/005; H04W 60/04; H04W
60/06

See application file for complete search history.

(56) References Cited

U.S. PATENT DOCUMENTS

| | | | | |
|---|---|---|---|---|
| 2006/0230161 | A1* | 10/2006 | Bae | H04L 65/1083 709/228 |
| 2008/0089486 | A1* | 4/2008 | Madour | H04W 4/90 379/45 |
| 2010/0136970 | A1* | 6/2010 | Mui | H04L 65/1073 455/435.1 |
| 2011/0083014 | A1* | 4/2011 | Lim | H04L 29/12764 713/168 |
| 2011/0145930 | A1* | 6/2011 | Gnech | G06F 21/6218 726/28 |
| 2011/0194554 | A1* | 8/2011 | Gavita | H04L 65/1016 370/352 |
| 2011/0251952 | A1* | 10/2011 | Kelly | G06Q 20/102 705/40 |
| 2012/0151091 | A1* | 6/2012 | Jose | H04L 61/2015 709/245 |
| 2015/0081123 | A1* | 3/2015 | Bose | G06F 1/3287 700/291 |
| 2015/0085856 | A1* | 3/2015 | Bouvet | H04L 65/1016 370/352 |
| 2017/0127371 | A1* | 5/2017 | Jiang | H04W 60/04 |
| 2017/0237782 | A1* | 8/2017 | Shen | H04L 65/1073 455/435.1 |

OTHER PUBLICATIONS

J. Rosenberg, "Obtaining and Using Globally Routable User Agent URIs (GRUUs) in the Session Initiation Protocol (SIP)," Network Working Group, RFC 5627, Internet Engineering Task Force, IETF; Standard, Internet Society (ISOC), Oct. 1, 2009, XP015065698, 40 pages.

3GPP TS 29.229 V12.1.0 (Dec. 2013), Technical Specification, 3rd Generation Partnership Project; Technical Specification Group Core Network and Terminals; Cx and Dx interfaces based on the Diameter protocol; Protocol details (Release 12), Dec. 13, 2013, pp. 1-37, XP050728792.

C. Jennings et al.: "Managing Client-Initiated Connections in the Session Initiation Protocol (SIP)," Network Working Group, RFC 5626, Internet Engineering Task Force, IETF; Standard, Internet Society (ISOC), Oct. 1, 2009, XP015065697, 50 pages.

3GPP TS 23.228 V12.4.0 (Mar. 2014), Technical Specification, 3rd Generation Partnership Project; Technical Specification Group Service and System Aspects; IP Multimedia Subsystem (IMS); Stage 2 (Release 12), Mar. 10, 2014, 307 pages.

3GPP TS 29.228 V12.1.0 (Dec. 2013), Technical Specification, 3rd Generation Partnership Project; Technical Specification Group Core Network and Terminals; IP Multimedia (IM) Subsystem Cx and Dx interfaces; Signalling flows and message contents (Release 12), Dec. 17, 2013, 73 pages.

J. Rosenberg et al.: "SIP: Session Initiation Protocol," Network Working Group, RFC 3261, Internet Engineering Task Force, IETF; Standard, Internet Society (ISOC), Jun. 2002, 269 pages.

3GPP TS 23.380 V11.3.0 (Mar. 2014), Technical Specification, 3rd Generation Partnership Project; Technical Specification Group Core Network and Terminals; IMS Restoration Procedures (Release 11), 3GPP Standard; Feb. 22, 2014, pp. 1-17, XP050769551.

3GPP TS 24.229 V12.4.0 (Mar. 2014), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 12), 3GPP Standard; Mar. 17, 2014, 825 pages.

Korean Office Action issued in corresponding Korean Patent Application No. 10-2016-7036394 dated Mar. 29, 2018.

* cited by examiner

INTERNET PROTOCOL MULTIMEDIA SUBSYSTEM (IMS) RESTORATION SUPPORT FOR TEMPORARY GLOBALLY ROUTABLE USER AGENT UNIFORM RESOURCE IDENTIFIER (GRUU)

FIELD OF THE INVENTION

The present invention relates to apparatuses, methods, systems, computer programs, computer program products and computer-readable media regarding IMS (Internet Protocol Multimedia Subsystem) restoration support for temporary GRUU (Globally Routable User Agent Uniform Resource Identifier).

BACKGROUND OF THE INVENTION

Some procedures required in 3GPP ($3^{rd}$ Generation Partnership Project) IMS to handle a S-CSCF (Serving Call Session Control Function) service interruption scenario with minimum impact to the service to the end user are described in 3GPP technical specification TS 23.380, which specifies how IMS restoration can be supported. Further, 3GPP TS 29.228 and 29.229 define how the information for IMS restoration is exchanged between HSS (Home Subscriber Server) and S-CSCF.

Furthermore 3GPP TS 24.229 includes the support of Globally Routable User Agent URIs (GRUUs), which is defined in RFC5627.

As defined in TS 23.228, section 4.3.3.2a, a Globally Routable User Agent URI (GRUU) is an identity that identifies a unique combination of Public User Identity and user equipment (UE) instance that allows a UE to address a SIP (Session Initiation Protocol) request to a specific Public User Identity UE combination instance, as opposed to a Public User Identity, in order to ensure that the SIP request is not forked to another registered UE of the same Public User Identity. There are two types of GRUUs: public GRUUs (P-GRUUs) and temporary GRUUs (T-GRUUs).

P-GRUUs are GRUUs that reveal the Public User Identity of the user and are very long lived. The public GRUU is permanent for the same Address of Record (AoR) (i.e. public user identity) and instance-ID pair.

T-GRUUs are GRUUs that contain a URI that do not reveal the Public User Identity of the user and are valid until the contact is explicitly de-registered or the current registration expires. The temporary GRUU must be changed with every re-registration. And all temporary GRUUs generated for an AoR and instance-ID pair for a registration are valid for the whole period of registration.

The IM CN (IP Multimedia Core Network) subsystem shall support the capability for IMS UEs to obtain both T-GRUUs and P-GRUUs when performing IMS registration, exchange GRUUs using SIP requests and responses and use GRUUs to address SIP requests to specific UEs according to RFC 5627.

As defined in TS 23.228, section 4.6.3, the Serving-CSCF (S-CSCF) performs the session control services for the UE. It maintains a session state as needed by the network operator for support of the services. Within an operators network, different S-CSCFs may have different functionalities. During a registration session, the S-CSCF may perform the following functions:

It may behave as a registrar, i.e. it accepts registration requests and makes its information available through the location server (e.g. HSS).

When a registration request includes an Instance ID with the contact being registered and indicates support for GRUU, the S-CSCF shall assign a unique P-GRUU and a new and unique T-GRUU to the combination of Public User Identity and Instance ID.

If a registration request indicates support for GRUU, the S-CSCF shall return the GRUU set assigned to each currently registered Instance ID.

The S-CSCF shall notify subscribers about registration changes, including the GRUU sets assigned to registered instances.

During registration process, the S-CSCF shall provide policy information, if available, for a Public User Identity from the HSS to the P-CSCF and/or UE.

The SIP registrar (in IMS it is the S-CSCF, as mentioned above) delivers both P-GRUU and T-GRUU in Contact header in 200 OK response to REGISTER request.

Each Public User Identity (i.e. Address of Record (AoR)) may have one or more Globally Routable User Agent URIs (GRUUs). As mentioned above, there are two types of GRUU, P-GRUUs and T-GRUUs which are associated with Public User Identities and are generated and assigned to the UE together during registrations and re-registration in a pair of one P-GRUU and one T-GRUU. Each pair of a P-GRUU and a T-GRUU is associated with one Public User Identity and one UE.

During subsequent re-registrations the same P-GRUU will be assigned to the UE but a new and different T-GRUU will be generated and assigned. After a re-registration all the previous T-GRUUs generated during the period of this registration are all still valid. A UE may retain some or all of the previous T-GRUUs obtained during the initial registration or previous re-registrations along with the new T-GRUU or the UE may replace some or all of the previous T-GRUUs with the new T-GRUU. The current set of the P-GRUU and all T-GRUUs which are currently valid during this registration period is referred to here as the GRUU set. If a UE registers (explicitly or implicitly) with multiple Public User Identities, a separate GRUU set is associated with each. If different UEs register with the same Public User Identity, a different GRUU set is associated with each.

FIG. 1 shows the relationship of Public User Identities, GRUUs, and UEs as defined in TS 23.228.

As shown in FIG. 1, each GRUU is associated with a certain Address of Record (AoR) (i.e. public user identity) and instance-ID pair. And each pair has a GRUU set (one P-GRUU and multiple T-GRUUs). All GRUUs in this set can be seen as equivalent. The S-CSCF is able to identify the GRUU set of a P-GRUU, because 3GPP requires that a P-GRUU must be generated from AoR+instance-ID. So when a P-GRUU is received, the S-CSCF can identify the GRUU set of the P-GRUU. And AoR+instance-ID can already be stored in HSS and can be restored during the existing IMS restoration procedure.

In a similar manner, this can also be done for T-GRUU even if 3GPP doesn't specify any algorithm to generate the T-GRUU. As long as AoR+Instance-ID can be retrieved from a received T-GRUU, the GRUU set of the T-GRUU can be identified. But this is not enough because the validation of the T-GRUU is also bound to Call-ID and Cseq (command sequence) values of the registration of the AoR+Instance-ID pair.

As defined in RFC 3261, Call-ID contains a globally unique identifier for this call.

CSeq or Command Sequence contains an integer and a method name. The CSeq number is incremented for each new request within a dialog and is a traditional sequence number.

Further, the address-of-record (AOR) is a SIP or SIPS URI that points to a domain with a location service that can map the URI to another URI where the user might be available. Typically, the location service is populated through registrations. An AoR is frequently thought of as the "public address" of the user.

Further, as defined in TS 24.229, an instance ID is an URN (Uniform Resource Name) generated by the device that uniquely identifies a specific device amongst all other devices, and does not contain any information pertaining to the user. The public user identity together with the instance ID uniquely identifies a specific UA instance.

Currently, the algorithm defined in RFC5627 doesn't support the retrieval of AoR, instance-ID, Call-ID and CSeq values from the T-GRUU.

Further, based on the current concept for IMS restoration procedure defined by 3GPP, the S-CSCF can store the latest Contact header of REGISTER response in HSS, which will overwrite the previous Contact header stored in HSS. Though the latest T-GRUU can be stored in HSS and can be restored at S-CSCF, all previously generated T-GRUUs are lost and cannot be restored.

SUMMARY OF THE INVENTION

It is therefore an object of the present invention to overcome the above mentioned problems and to provide apparatuses, methods, systems, computer programs, computer program products and computer-readable media regarding IMS (Internet Protocol Multimedia Subsystem) restoration support for temporary GRUU (Globally Routable User Agent Uniform Resource Identifier).

According to an aspect of the present invention there is provided a method comprising:
  Creating, at a registrar, a registration identified by a registration identifier,
  Storing, by the registrar, the registration identifier, a call identifier and an initial command sequence related to the registration identified by the registration identifier in a persistent database during the registration.

According to another aspect of the present invention, there is provided a method comprising:
  Receiving, at a registrar, a temporary user identifier,
  Retrieving, by the registrar, a registration identifier and a public user identity, a device identifier, a call identifier and a command sequence related to a registration identified by the registration identifier,
  Verifying, at the registrar, the validity of the temporary user identifier based on the retrieved public user identity, device identifier, call identifier and command sequence and information of the related registration.

According to another aspect of the present invention, there is provided a method comprising:
  Receiving, at a persistent database, during a registration, a registration identifier identifying the registration, and a call identifier and an initial command sequence related to the registration identified by the registration identifier,
  Storing the received registration identifier, and the call identifier and the initial command sequence related to the registration identified by the registration.

According to another aspect of the present invention, there is provided an apparatus comprising:

at least one processor,
and
at least one memory for storing instructions to be executed by the processor, wherein the at least one memory and the instructions are configured to, with the at least one processor, cause the apparatus at least to perform:
  Creating, at a registrar, a registration identified by a registration identifier,
  Storing, by the registrar, the registration identifier, a call identifier and an initial command sequence related to the registration identified by the registration identifier in a persistent database during the registration.

According to another aspect of the present invention, there is provided an apparatus comprising:
  Receiving, at a registrar, a temporary user identifier,
  Retrieving, by the registrar, a registration identifier and a public user identity, a device identifier, a call identifier and a command sequence related to a registration identified by the registration identifier,
  Verifying, at the registrar, the validity of the temporary user identifier based on the retrieved public user identity, device identifier, call identifier and command sequence and information of the related registration.

According to another aspect of the present invention, there is provided an apparatus comprising:
  Receiving, at a persistent database, during a registration, a registration identifier identifying the registration, and a call identifier and an initial command sequence related to the registration identified by the registration identifier,
  Storing the received registration identifier, and the call identifier and the initial command sequence related to the registration identified by the registration.

According to another aspect of the present invention there is provided an apparatus comprising:
  means for creating, at a registrar, a registration identified by a registration identifier,
  means for storing, by the registrar, the registration identifier, a call identifier and an initial command sequence related to the registration identified by the registration identifier in a persistent database during the registration.

According to another aspect of the present invention there is provided an apparatus comprising:
  means for receiving, at a registrar, a temporary user identifier,
  means for retrieving, by the registrar, a registration identifier and a public user identity, a device identifier, a call identifier and a command sequence related to a registration identified by the registration identifier,
  means for verifying, at the registrar, the validity of the temporary user identifier based on the retrieved public user identity, device identifier, call identifier and command sequence and information of the related registration.

According to another aspect of the present invention there is provided an apparatus comprising:
  means for receiving, at a persistent database, during a registration, a registration identifier identifying the registration, and a call identifier and an initial command sequence related to the registration identified by the registration identifier,
  means for storing the received registration identifier, and the call identifier and the initial command sequence related to the registration identified by the registration.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
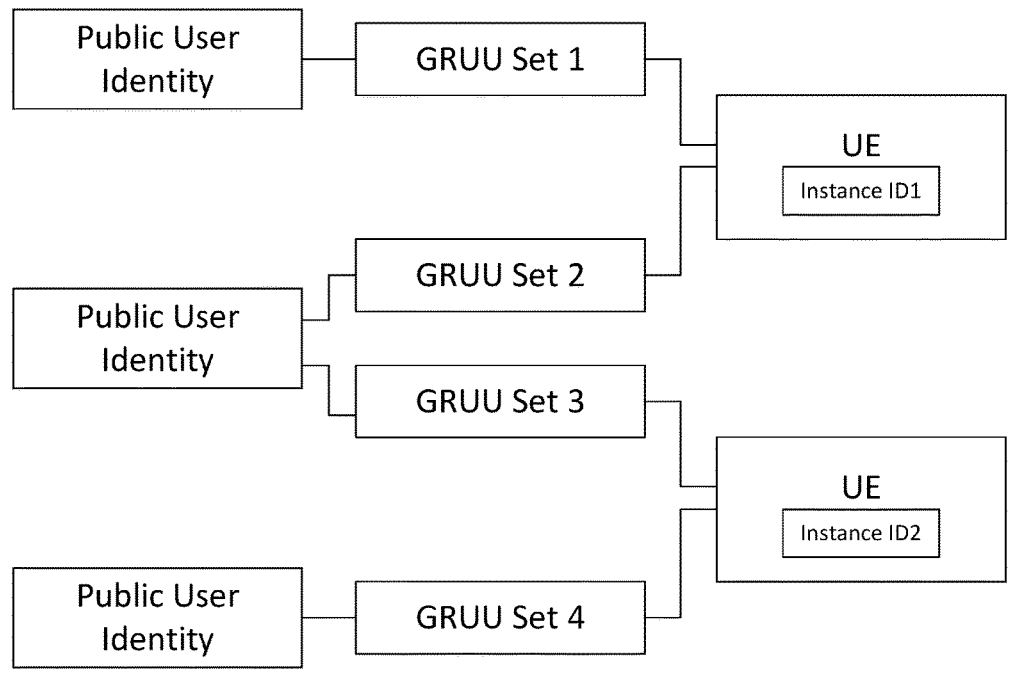
FIG. 1 is a diagram illustrating a relationship of Public User Identities, GRUUs, and UEs.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such type of communication system or communication network, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

Document RFC5627 suggests using an algorithm to avoid remembering all T-GRUUs generated for a certain registration.

However, still certain information for the algorithm should be stored persistently.

According to certain aspects of the present invention, some kinds of information shall be stored persistently, that is, such T-GRUU generation related information should be included into the existing IMS restoration information stored in HSS. With this proposal, the S-CSCF with the restored IMS registration can recognize whether a received T-GRUU is a valid one or not According to certain aspects of the present invention, the T-GRUU generation related information is stored at the HSS as part of IMS restoration information for a certain registration, by extending the existing 3GPP Cx interface. During IMS restoration procedure, this T-GRUU related information is downloaded to S-CSCF again, together with IMS restoration information.

The T-GRUU related information can be embedded in the Cx message in various ways and how exactly this is done is not relevant of the idea of the present invention. However, as an example, the following is noted.

The existing AVPs are as follows:
SCSCF-Restoration-Info::=<AVP Header: 639, 10415>
  {User-Name}
  1*{Restoration-Info}
  [SIP-Authentication-Scheme]
  *[AVP]
Restoration-Info::=<AVP Header: 649, 10415>
  {Path}
  {Contact}
  [Subscription-Info]
  *[AVP]

According to certain aspects of the present invention, the Restoration-Info AVP could be extended as follows:
Restoration-Info::=<AVP Header: 649, 10415>
  {Path}
  {Contact}
  [Subscription-Info]
  [Call-ID]
  [Initial-CSeq]
  [Registration-ID]
  [T-Gruu-Generation-Algorithm]
  *[AVP]

While the Call-ID AVP and Initial-Cseq AVP are used to backup the Call-ID and initial CSeq value of the initial REGISTER request, the T-Gruu-Generation-Algorithm AVP can be used to backup the T-GRUU generation algorithm related information. And the Registration-ID is used to identify the related registration. They are optional to provide backwards compatibility.

After IMS restoration, the restored IMS registration is identified by the Registration-ID and contains restored information, e.g. Path, Contact, Call-ID, initial-CSeq, Registration-ID, etc.

It is noted that the above extension of the Restoration-Info AVP is only an illustrating example and that the present invention not limited thereto.

Thus, according to certain aspects of the present invention, the S-CSCF generates the T-GRUU in such a way that the S-CSCF can retrieve the AoR, instance-ID, Call-ID, Registration-ID and CSeq from any T-GRUU, which was generated by that S-CSCF.

One example of a possible T-GRUU generation algorithm is shown below:
T-GRUU="sip:Hash(s-cscf name)||encrpt(AoR;Instance-Id;Call-Id;Cseq;Reg-id)@imsdomain;gr".

Another example of a possible T-GRUU generation algorithm is shown as follows:
T-GRUU="sip: encrpt(AoR;Instance-Id;Call-Id;Cseq;Reg-id)@s-cscf-name.imsdomain;gr".

In the first example of the algorithm, the Hash of S-CSCF name is needed to identify all T-GRUUs generated by a certain S-CSCF and avoid exposing the S-CSCF name due to topology hiding (THIG). The second example of the algorithm embeds the S-CSCF FQDN in SIP domain part if no THIG is required. The S-CSCF could even embed the indication of the used algorithm in the T-Gruu-Generation-Algorithm AVP.

However, it is noted that the above examples of algorithms are merely illustrating examples and that the present invention is not limited thereto.

As mentioned above, the exact algorithm need not be standardized. In the second example mentioned above, a T-GRUU is always routed to the S-CSCF which generates it because the hostname of a T-GRUU is always set to the host name of the S-CSCF which generates the T-GRUU. Thus, this S-CSCF needs to be able to retrieve these parameter values from the T-GRUU generated by itself.

For the first example the 3GPP wildcarded PSI shall be used for the routing purpose. Thus, in HSS all SIP URIs beginning with Hash (s-cscf name) are assigned to the address of that S-CSCF. When a request containing T-GRUU is received, the I-CSCF will query the HSS with Cx-LIR request and the HSS will return the assigned S-CSCF address back to the I-CSCF. The I-CSCF will then route the request with the T-GRUU to the assigned S-CSCF.

Thus, according to certain aspects of the present invention, in addition to current restoration information stored in HSS, which already includes AoR and Instance-ID, the additional information related to the T-GRUU (Call-ID and initial Cseq value) shall also be stored in HSS as IMS restoration information. This can ensure that the S-CSCF is able to identify whether a received T-GRUU is still a valid T-GRUU of a restored IMS registration (AoR+Instanced-ID).

When the S-CSCF receives a T-GRUU, it can decrypt the part before the "@" sign and retrieve the AoR, Instance-ID, Call-ID, CSeq and registration-ID. The reg-ID is used to identify the related registration. If the retrieved AoR is matched to any IMPU (IP Multimedia Public Identity) of the related registration, the retrieved instance-ID and Call-ID are matched to those of the registration, and the retrieved Cseq>=Initial-CSeq, the received T-GRUU is a valid one.

After the next re-registration, the CSeq of the re-REGISTER request is used as the up-to-update CSeq and the CSeq comparison is changed to up-to-update CSeq>=retrieved Cseq>=Initial-CSeq Thus, it is an advantage of certain aspects of the present invention that it closes the gap of the current 3GPP IMS restoration procedure, where T-GRUU cannot be restored properly.

In summary, according to certain aspects of the present invention, the following steps are performed.

The S-CSCF stores Call-ID, initial CSeq and registration-ID in HSS during initial registration. AoR and Instance-ID can already be stored in HSS with the current 3GPP speciation, i.e. in Public-Identity AVP and in Contact AVP in Cx-SAR request. The registration is created at S-CSCF and is identified by the registration-ID.

During IMS restoration, the S-CSCF shall restore the IMS registration and use the restored registration-ID to identify the restored registration. AoR, Instance-ID can be restored with the current 3GPP procedure, and the present application provides support for restoring Call-ID and initial-CSeq.

The T-GRUU generation algorithm will embed registration-ID, AoR, Instance-ID, Call-ID, CSeq of REGISTER to generate a T-GRUU for the received REGISTER request. The latest generated T-GRUU could be optionally stored in HSS within the existing Contact AVP. In this case additional Cx-SAR shall be sent to HSS for every (re-)REGISTER request. The Cseq retrieved from the restored T-GRUU shall be stored as the up-to-date CSeq. Otherwise only the first T-GRUU is stored in HSS and no up-to-date CSeq can be retrieved (the CSeq in the first T-GRUU==initial CSeq)

Further, the S-CSCF retrieves information from the received T-GRUU and compares them with the information of the related registration in order to validate the received T-GRUU.

In the following, a more general description of certain embodiments of the present invention is made with respect to FIGS. 2 to 5.

Figure 2:
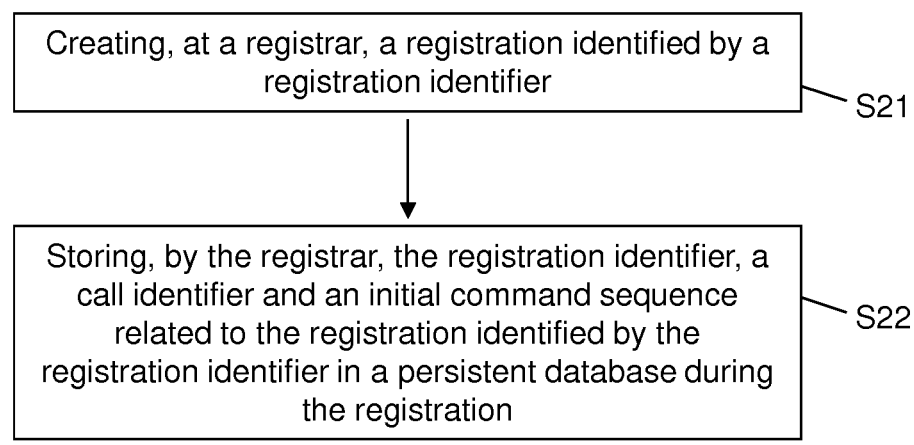
FIG. 2 is a flowchart illustrating an example of a method according to example versions of the present invention.

FIG. 2 is a flowchart illustrating an example of a method according to example versions of the present invention.

According to example versions of the present invention, the method may be implemented in a registrar like, for example, a S-CSCF, or the like. The method comprises creating, at the registrar, a registration identified by a registration identifier in a step S21, and storing in step S22, by the registrar, the registration identifier, a call identifier, and an initial command sequence related to the registration identified by the registration identifier in a persistent database during the registration.

According to example versions of the present invention, the method further comprises generating, at the registrar, a temporary user identifier related to the registration identified by the registration identifier, and storing, by the registrar, information related to an algorithm for generating the temporary user identifier in the persistent database.

According to example versions of the present invention, the method further comprises restoring, at the registrar, the registration, identifying the restored registration using the registration identifier stored in the database, and restoring the call identifier, and the initial command sequence using the registration identifier.

According to example versions of the present invention, the method further comprises restoring the temporary user identity, retrieving the command sequence from the restored temporary user identity, and storing the retrieved command sequence of the restored temporary user identity as up-to-date command sequence.

According to example versions of the present invention, the registrar is a Serving Call Session Control Function, and the persistent database is a Home Subscriber Server.

Figure 3:
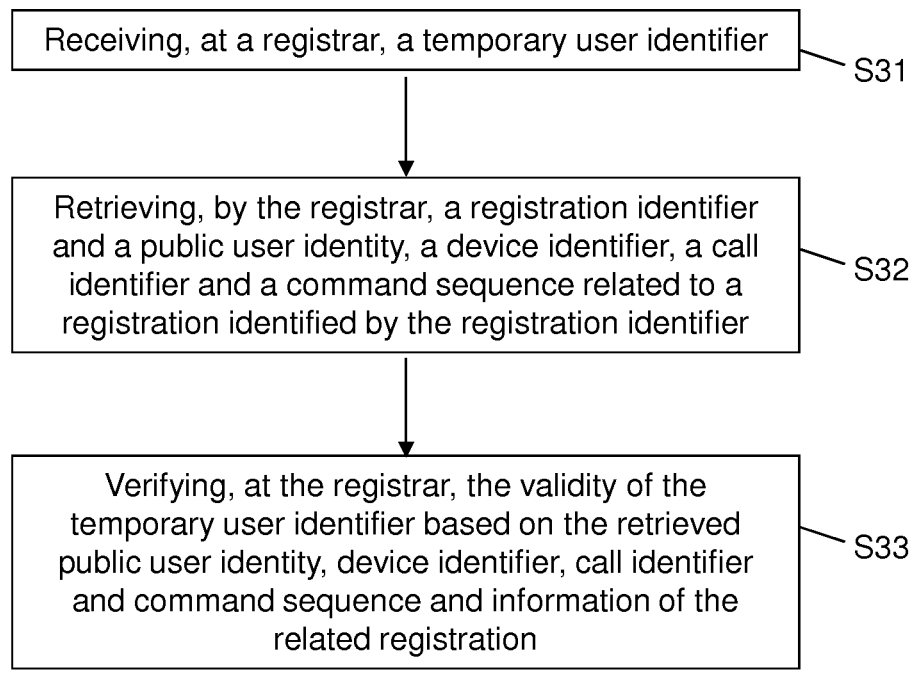
FIG. 3 is a flowchart illustrating another example of a method according to example versions of the present invention.

FIG. 3 is a flowchart illustrating another example of a method according to example versions of the present invention.

According to example versions of the present invention, the method may be implemented in a registrar like, for example, a S-CSCF, or the like. The method comprises receiving, at a registrar, a temporary user identifier in a step S31, retrieving, by the registrar, a registration identifier and a public user identity, a device identifier, a call identifier and a command sequence related to a registration identified by the registration identifier in a step S32, and verifying, at the registrar, the validity of the temporary user identifier based on the retrieved public user identity, device identifier, call identifier, command sequence and information of the related registration in a step S33.

Figure 4:
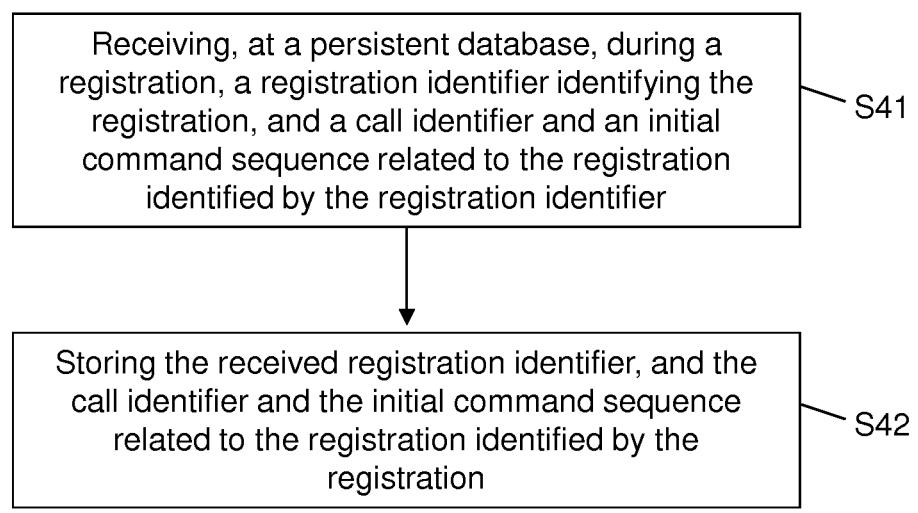
FIG. 4 is a flowchart illustrating another example of a method according to example versions of the present invention.

According to example versions of the present invention, the validity of the temporary user identifier is verified if the retrieved public user identity, the retrieved device identifier, and the retrieved call identifier match with a public user identity, a device identifier, and a call identifier, respectively, related to the registration identified by the registration identifier, and if a value of the retrieved command sequence is equal to or larger than a value of the initial command sequence related to the registration identified by the registration identifier FIG. 4 is a flowchart illustrating another example of a method according to example versions of the present invention.

According to example versions of the present invention, the method may be implemented in a persistent database, like for example, a HSS, or the like. The method comprises receiving, at a persistent database, during a registration, a registration identifier identifying the registration, a call identifier and an initial command sequence related to the registration identified by the registration identifier in a step S41, and storing the received registration identifier, and the call identifier and the initial command sequence related to the registration identified by the registration in a step S42.

According to example versions of the present invention, the method further comprises receiving, at the persistent database, a request, from the registrar, for providing the registration identifier identifying the registration, and the call identifier and the initial command sequence related to the registration identified by the registration identifier, and transmitting the registration identifier identifying the registration, and the call identifier and the initial command sequence related to the registration identified by the registration identifier to the registrar.

Figure 5:
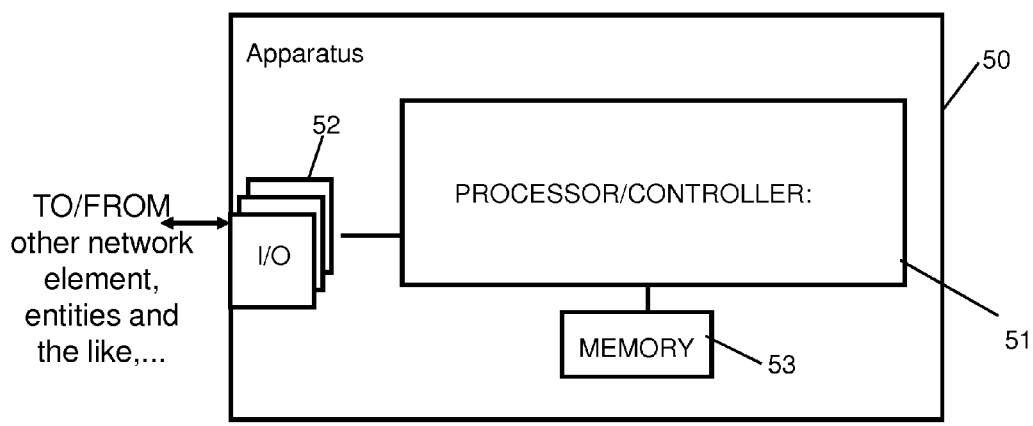
FIG. 5 is a diagram illustrating an example of an apparatus according to example versions of the present invention.

FIG. 5 is a block diagram showing an example of an apparatus according to example versions of the present invention.

In FIG. 5, a block circuit diagram illustrating a configuration of an apparatus 50 is shown, which is configured to implement the above described aspects of the invention. It is to be noted that the apparatus 50 shown in FIG. 5 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 50 may comprise a processing function or processor 51, such as a CPU or the like, which executes instructions given by programs or the like related to the flow control mechanism. The processor 51 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 52 denotes transceiver or input/output (I/O) units (interfaces) connected to the processor 51. The I/O units 52 may be used for communicating with one or more other network elements, entities, terminals or the like. The I/O units 52 may be a combined unit comprising communication equipment towards several network elements, or may comprise a distributed structure with a plurality of different interfaces for different network elements. Reference sign 53 denotes a memory usable, for example, for storing data and programs to be executed by the processor 51 and/or as a working storage of the processor 51.

The processor 51 is configured to execute processing related to the above described aspects. In particular, the apparatus 50 may be implemented in or may be part of a registrar, i.e. a S-CSCF, or the like, and may be configured to perform a method as described in connection with FIG. 2. Thus, the processor 51 is configured to perform creating, at a registrar, a registration identified by a registration identifier, and storing, by the registrar, the registration identifier, a call identifier and an initial command sequence related to the registration identified by the registration identifier in a persistent database during the registration.

According to example versions of the present invention, the apparatus 50 may also be implemented in or may be part of a registrar, i.e. a S-CSCF, or the like, and may be configured to perform a method as described in connection with FIG. 3. Thus, the processor 51 is configured to perform receiving, at a registrar, a temporary user identifier, retrieving, by the registrar, a registration identifier and a public user identity, a device identifier, a call identifier and a command sequence related to a registration identified by the registration identifier, and verifying, at the registrar, the validity of the temporary user identifier based on the retrieved public user identity, device identifier, call identifier and command sequence and information of the related registration.

According to example versions of the present invention, the apparatus 50 may also be implemented in or may be part of a persistent database, i.e. a HSS, or the like, and may be configured to perform a method as described in connection with FIG. 4. Thus, the processor 51 is configured to perform receiving, at a persistent database, during a registration, a registration identifier identifying the registration, and a call identifier and an initial command sequence related to the registration identified by the registration identifier, and storing the received registration identifier, and the call identifier and the initial command sequence related to the registration identified by the registration Thus, according to example versions of the present invention, there are provided apparatuses 50, for the registrar according to certain aspects for the invention as well as for the persistent database, and the apparatuses each have a structure as illustrated in FIG. 5.

For further details regarding the functions of the apparatus 50, reference is made to the description of the methods according to example versions of the present invention as described in connection with FIGS. 2 to 4.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
  method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the aspects/embodiments and its modification in terms of the functionality implemented;
  method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
  devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
  a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
creating, at a registrar, a registration identified by a registration identifier;
storing, by the registrar, the registration identifier, a call identifier, and an initial command sequence related to the registration identified by the registration identifier in a persistent database during the creation of the registration;
generating, at the registrar, a temporary user identifier related to the registration identified by the registration identifier; and
storing, by the registrar, information related to an algorithm for generating the temporary user identifier in the persistent database.

2. The method according to claim 1, further comprising:
restoring, at the registrar, the registration;
identifying the restored registration using the registration identifier stored in the persistent database; and
restoring the call identifier and the initial command sequence using the registration identifier.

3. The method according to claim 1, further comprising:
restoring the temporary user identifier;
retrieving the command sequence from the restored temporary user identifier; and
storing the retrieved command sequence of the restored temporary user identifier as an up-to-date command sequence.

4. A method, comprising:
receiving, at a persistent database, during a registration, a registration identifier identifying the registration, a call identifier, and an initial command sequence related to the registration identified by the registration identifier;
storing the received registration identifier, the call identifier, and the initial command sequence related to the registration identified by the registration identifier;
receiving, at the persistent database, a request, from a registrar, for providing the received registration identifier, the call identifier, and the initial command sequence related to the registration identified by the registration identifier; and in response to receiving the request, transmitting, the persistent database, the received registration identifier, the call identifier, and the initial command sequence related to the registration identified by the registration identifier to the registrar.

5. The method according to claim 4, further comprising:
receiving, at the persistent database, a request, from the registrar, for providing the registration identifier identifying the registration, the call identifier, and the initial command sequence related to the registration identified by the registration identifier; and
transmitting the registration identifier identifying the registration, the call identifier, and the initial command sequence related to the registration identified by the registration identifier to the registrar.

6. An apparatus comprising:
at least one processor; and
at least one memory for storing instructions to be executed by the processor, wherein the at least one memory and the instructions are configured to, with the at least one processor, cause the apparatus at least to perform:
creating, at a registrar, a registration identified by a registration identifier; and
storing, by the registrar, the registration identifier, a call identifier, and an initial command sequence related to the registration identified by the registration identifier in a persistent database during the creation of the registration;
generating, at the registrar, a temporary user identifier related to the registration identified by the registration identifier; and
storing, by the registrar, information related to an algorithm for generating the temporary user identifier in the persistent database.

7. The apparatus according to claim 6, wherein the at least one memory and the instructions are further configured to, with the at least one processor, cause the apparatus at least to perform:
restoring, at the registrar, the registration;
identifying the restored registration using the registration identifier stored in the database; and
restoring the call identifier and the initial command sequence using the registration identifier.

8. The apparatus according to claim 6, wherein the at least one memory and the instructions are further configured to, with the at least one processor, cause the apparatus at least to perform:
restoring the temporary user identifier;
retrieving the command sequence from the restored temporary user identifier; and
storing the retrieved command sequence of the restored temporary user identifier as an up-to-date command sequence.

9. An apparatus comprising:
at least one processor; and
at least one memory for storing instructions to be executed by the processor, wherein the at least one memory and the instructions are configured to, with the at least one processor, cause the apparatus at least to perform:
receiving, at a persistent database, during a registration, a registration identifier identifying the registration, a call identifier, and an initial command sequence related to the registration identified by the registration identifier;

storing the received registration identifier, the call identifier, and the initial command sequence related to the registration identified by the registration identifier;

receiving, at the persistent database, a request, from a registrar, for providing the received registration identifier, the call identifier, and the initial command sequence related to the registration identified by the registration identifier; and in response to receiving the request, transmitting, by the persistent database, the received registration identifier, the call identifier, and the initial command sequence related to the registration identified by the registration identifier to the registrar.

10. The apparatus according to claim 9, further comprising:

receiving, at the persistent database, a request, from the registrar, for providing the registration identifier identifying the registration, the call identifier, and the initial command sequence related to the registration identified by the registration identifier; and transmitting the registration identifier identifying the registration, the call identifier, and the initial command sequence related to the registration identified by the registration identifier to the registrar.

11. A computer program product embodied on a non-transitory computer-readable medium, said product including a program for a processing device, comprising software code portions for performing the steps of claim 1 when the program is run on the processing device.

12. The computer program product according to claim 11, wherein the program is directly loadable into an internal memory of the processing device.

* * * * *